April 21, 1970     E. BERMAN ET AL     3,507,563

COLOR-REVERSIBLE ANTI-GLARE MIRROR

Filed Feb. 1, 1967

ELLIOT BERMAN
RICHARD W. PHILBRICK
INVENTORS

BY *W. Gary Goodson*

ATTORNEY

United States Patent Office 3,507,563
Patented Apr. 21, 1970

3,507,563
COLOR-REVERSIBLE ANTI-GLARE MIRROR
Elliot Berman, Quincy, and Richard W. Philbrick, Concord, Mass., assignors to Itek Corporation, Lexington, Mass., a corporation of Delaware
Filed Feb. 1, 1967, Ser. No. 613,153
Int. Cl. G02b 17/00
U.S. Cl. 350—278
14 Claims

ABSTRACT OF THE DISCLOSURE

A color-reversible anti-glare mirror which is especially suitable for use as a rear view mirror in a motor vehicle. A mirrored viewing surface is used in combination with a color-reversible layer. The color-reversible layer when in darkness possesses the property of being able to attenuate bright light, which is shined upon it. This color-reversible layer, however, becomes essentially colorless when the lumination for a prolonged period of time approaches that of normal daylight. Color-reversible materials are: photochromic and/or thermochromic compounds.

BACKGROUND OF THE INVENTION

(1) Field of the invention

This invention relates to improvements in anti-glare mirrors and in a preferred embodiment thereof which is concerned with improvements in rear view mirrors particularly adapted for vehicles.

(2) Description of the prior art

A common problem in motor vehicle operation is the annoyance caused the driver by the glare of bright lights shining at night in the view mirror attached thereto. Reflections of the glare from the bright lights of other moving vehicles are extremely annoying and may become blinding and, therefore, dangerous.

Efforts have been made to solve this problem by a number of different approaches. One approach has been to use a two-position rear view mirror of the prismatic type utilizing a swingable prism having a coated surface and a non-coated surface. This type of mirror possesses both a bright and a low intensity reflecting surface regardless of the day or night position of the prism. These reflecting surfaces are separated by an angle of only a few degrees and give double reflections which at night produce double images that may be annoying and troublesome to the driver. Another approach has been to use a rear view mirror containing a fluid light controlling medium. The light transmittance of this mirror is controlled by the amount of optically dense fluid in front of the mirror. The amount of fluid light-controlling medium in front of the mirror is in turn controlled by a pump system. Such a mirror system is of necessity very complex and expensive.

SUMMARY OF THE INVENTION

This invention relates to a relatively inexpensive and simple mirror system especially suitable for use as a rear view mirror in a motor vehicle and comprises a mirrored viewing surface used in combination with a color-reversible layer. The color-reversible layer has the property of attenuating light when in substantial darkness. However, when this color-reversible layer is placed in substantial light, the light attenuating property thereof is substantially lost. The color-reversible layer is preferably a material which is colored when in substantial darkness and colorless when in substantial light. This layer is placed in such a position relative to the mirrored viewing surface that light passing from a light source to the viewer by way of this mirror must pass through this color-reversible layer. The color-reversible layer comprises, for example, thermochromic and/or photochromic compounds which are colorless in substantial light and automatically become colored in substantial darkness.

This invention is particularly useful in providing anti-glare or glare reducing mirrors to eliminate a portion of at least the glare of a following vehicle whereby to enhance the safety and comfort of night vehicle driving. Thus the mirror system of this invention does not unduly limit vision for normal daytime driving but does protect the driver from the glare of bright headlights of a vehicle following from the rear at night. Furthermore, the mirror system of this invention can be so constructed that the glare from bright headlights does not substantially impair the glare reducing ability of the mirror system. These and other advantages of this invention will be apparent from the following disclosure.

DESCRIPTION OF THE PREFERRED EMBODIMENT(S)

Figure 1:
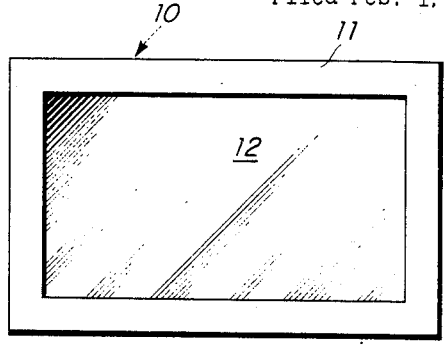
FIGURE 1 is a perspective view of one form of anti-glare mirror constructed in accordance with the invention.
Figure 2:
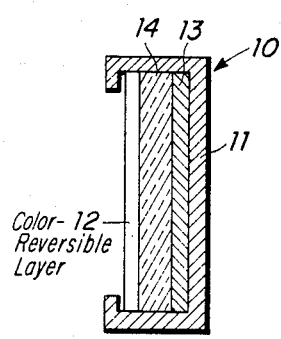
FIGURE 2 is a cross-sectional view of the mirror in FIGURE 1.
Figure 3:
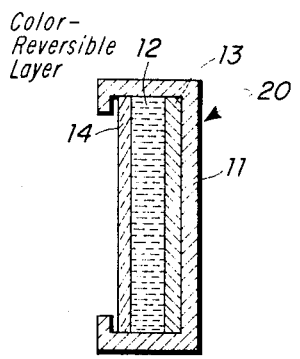
FIGURES 3-7 are cross-sectional views of mirrors similar to that of FIGURE 1.
Figure 4:
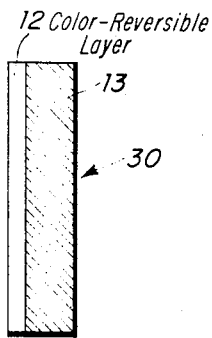
Figure 5:
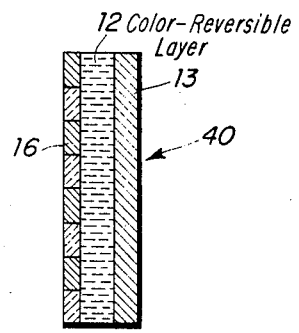
Figure 6:
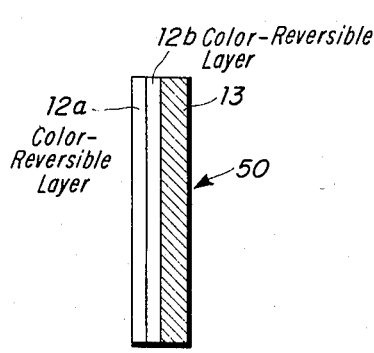
Figure 7:
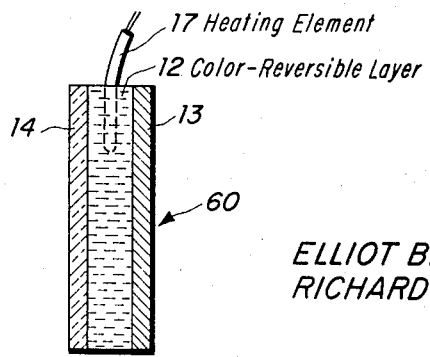

Referring more particularly to the drawings wherein like numerals refer to like parts, one form of the invention is indicated at 10 in FIGURES 1 and 2 wherein a mirror suitable as a rear view mirror for vehicles is composed of a frame or the like 11 supporting a front layer 12 which in this embodiment comprises a layer of color-reversible material an intermediate body layer of glass or the like 14 and a reflecting surface 13. The color-reversible layer 12 is in a form such as incorporated in a resin which enables it to be coated on the glass intermediate layer 14. FIGURE 3 illustrates an anti-glare mirror comprising a color-reversible layer 12 in the form of a solution between the glass layer 14 and the reflecting surface 13. FIGURE 4 illustrates an embodiment wherein the color-reversible layer 12 is applied directly to the reflecting surface 13. FIGURE 5 illustrates an embodiment wherein the color-reversible layer 12 is incorporated in an intermediate layer between a partially reflective surface 16 and a reflective surface 13. Therefore, when the color-reversible layer 12 becomes opaque so as to inactivate the reflective surface 13 the partially reflective surface 16 does give a partial image. However, the partially reflective surface 16 when acting alone would not transmit the full glare of headlights from the rear which would be the case when both the partially reflective surface 16 and the reflecting surface 13 are both active and fully reflecting. Multiple layers of color-reversible material may also be used in combination with a reflective surface as illustrated in FIGURE 6. For example, the first color-reversible layer 12a may contain a different color-reversible material than is contained in color-reversible layer 12b. Therefore, the color-reversible 12a may change color at one stage of darkness, for example, at dusk and color-reversible layer 12b may change color at another stage of darkness, for example, at substantially absolute darkness; therefore, by the proper choice of color-reversible material the mirror of FIGURE 6 could become progressably less reflective as the surroundings become progressively darker. FIGURE 7 illustrates an embodiment wherein an intermediate color-reversible layer 12 is attached to a heating element 17 which enables a person to change the color of the color-reversible layer when this layer is a thermochromic material by activating or deactivating heating element 17. These figures demonstrate that many variations of this invention are possible. The essential feature of this invention is that a color-reversible layer is used in combination with a mirror viewing surface and said color-reversible layer is located in a position relative to the mirror viewing surface that light passing from the light source to the viewer by the way of said mirrored viewing surface must pass through the color-reversible layer.

The color-reversible layer of this invention has the property of being color-reversible and by changes in luminous intensity, temperature, and/or other like means, the transparency of this layer can be reversibly varied in order to obtain an opaque or colored layer when in substantial darkness. This opaque or colored layer should preferably retain its color when exposed to light having a luminous intensity comparable to the light from the glare of a vehicle approaching from the rear or change color so slowly that the short exposure from the glare of a following vehicle will not change the color of the color-reversible layer. Examples of thermochromic and/or photochromic materials which are suitable for the color reversible materials of this invention are those compounds disclosed in U.S. Patent No. 2,710,274, incorporated herein by reference, and which, for example, are transparent at a temperature of 18° C. and on increase in temperature become thermoreversibly opaque at a predetermined temperature. A film of methyl polyvinyl ether having water adsorbed thereto forms a suitable color reversible material which is optically homogeneous and substantially transparent at a temperature below 18° C. and on increase in temperature becomes thermoreversibly opaque.

Examples of other color-reversible materials useful in this invention are photochromic materials such as disclosed in U.S. Patent No. 3,212,898, and in copending application Ser. No. 470,579 filed July 8, 1967, in the name of E. Berman. An especially preferred class of color-reversible compounds useful in this invention are the spiropyrans of the following two forms:

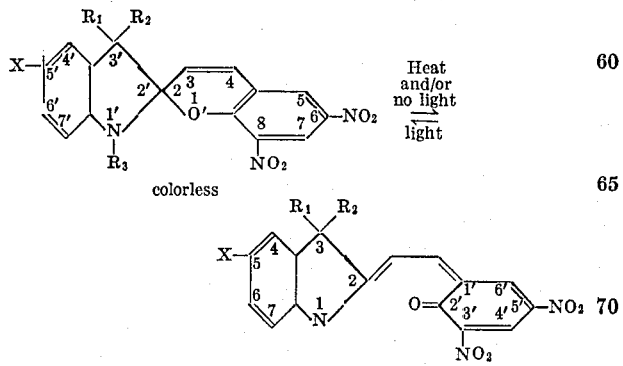

wherein X represents a halide group, a nitro group, or a hydrogen group, and wherein $R_1$, $R_2$, and $R_3$ may be the same or different and are alkyl and/or aryl groups. More particularly $R_1$, $R_2$, and $R_3$ may be an alkyl, aryl, alkaryl, or aralkyl group and any of $R_1$, $R_2$, and $R_3$ may be the same or different. Preferred embodiments are where X represents a chloride radical, a nitro radical, or a hydrogen radical, and wherein $R_1$, $R_2$, and $R_3$ represent lower alkyl groups, and more preferably methyl groups. These preferred embodiments are materials which at room temperature are stable in the colored state. The colored state can be converted to an essentially colorless state by irradiation with visible light. The colorless state can only be reconverted to the colored state of high optical density by heating. Irradiation of the colorless state of these compounds with ultraviolet light only effects a partial conversion to the stable colored state in the absence of heat. To convert the unstable colorless or essentially colorless materials to the colored state, it is necessary to apply heat to these materials, namely, to temperatures between about 25° C. and 200° C. Increasing the temperature between this range speeds the reversible reaction. The color change may, for example, take several hours at about 25° C. whereas at about 200° C. the change will occur almost instantaneously.

It will be understood that the temperature at which these color-reversible materials change color and the length of time required for this color change to occur will depend upon such factors as the amount of lumination, concentration of the color-reversible material, nature of the solvent or binder used, and the like.

The color-reversible materials of this invention may be employed in any form which enables the color-reversible quality to be most advantageously employed. For example, it may be advantageous to employ the color-reversible materials in the form of a solution. It may be desirable to incorporate the color-reversible materials in an essentially transparent resinous material. Thus the color-reversible materials may be dispersed in a liquid solvent and utilized in this liquid form in the mirror system of this invention. On the other hand, the compounds which form the color-reversible materials of this invention may be dissolved in a liquid solvent together with the resinous binders and then cast as films upon the reflecting mirrored surface. The color-reversible materials may also be used in the forms of solutions which have been microscopically encapsulated as by the process disclosed in U.S. Patent No. 2,800,457 and the capsules which being made of gelatin and gum arabic are sufficiently translucent to transmit light. The capsules are then used as a coating on a transparent support and these capsules may be treated by inclusions in the capsule wall so that they have a light scattering effect. The color-reversible materials of this invention may also be incorporated in resinous binders as disclosed, for example, in U.S. Patent 3,212,898.

The color-reversible layer of this invention preferably forms part of a unitary anti-glare mirror system, as for example as a coating on a mirror surface. However, it is within the scope of this invention to employ the color-reversible layer of this invention in a layer physically separated from the mirror, as for example, in the form of a color-reversible rear window in an automobile.

The color-reversible materials used in this invention may be used as mixtures incorporating more than one color-reversible material in a given layer. For example, a particular mixture may be utilized to obtain a particularly desired colored form of the color-reversible layer. It is also within the skill of the art to use various color-reversible materials with light filters and sensitizers to make particular materials sensitive to particular types of radiation.

The following examples are given by way of illustration and should not be construed as a limitation of the invention described herein.

EXAMPLE 1

The following ingredients are added to a suitable container:

| | Parts by weight |
|---|---|
| Dioctylphthalate [1] | .5 |
| 6,8-dinitro BIPS [2] | 1.5 |
| Saran [3] | 98 |

[1] Plasticizer.
[2] 1',3,'3'-trimethyl - 6,8 - dinitro-spiro-[indoline-2,2'-(2H-1) benzopyran], which is the colorless form of the following two forms:

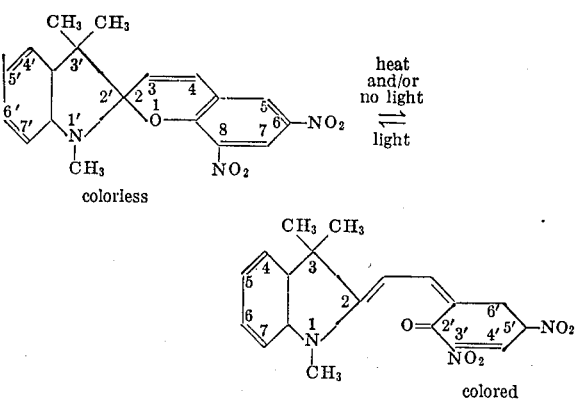

(The colorless form above could also be named 1,3,3-trimethyl-6',8' dinitrospiro-(2H-1-benzopyran-2,2'-indoline) in an alternative method of nomenclature. The colored form is 1,3,3-trimethyl - 2 - [(2'-oxo-3',5'-dinitrocyclohexadienylidene)-ethylidene]-indoline).

[3] Vinylidene chloride-acrylonitrile copolymer.

Add sufficient methylethylketone to dissolve the above ingredients. Evaporate while dissolving in order to end with a solution having sufficient viscosity to use as a coating material. Coat this composition on the viewing surface of a rear view mirror. In a substantial absence of light the thus coated rear view mirror (anti-glare mirror) becomes colored and acts to attenuate light from the glare of the headlights of automobiles following from the rear. Exposure of the colored anti-glare mirror to ambient day-light conditions causes the mirror to become colorless.

EXAMPLE 2

The procedure of Example 1 is followed except that 5'-chloro-6,8-dinitro BIPS is substituted for the 6,8-dinitro BIPS. The 5'-chloro-6,8-dinitro BIPS compound has the same structure as the 6,8-dinitro BIPS compound except that a chloro group is in the 5' position on the 6,8-dinitro BIPS structure.

EXAMPLE 3

The 6,8-dinitro BIPS compound of Example 1 is dissolved in methylene chloride with heating. The solution thus prepared is poured into a mirror having a hollow cavity between the protective glass and the reflective surface of the mirror. In the darkness the mirror becomes colored and in prolonged sunlight the mirror becomes colorless.

EXAMPLE 4

The procedure of Example 3 is followed except that 5'-chloro-6,8-dinitro BIPS of Example 2 is substituted for the 6,8-dinitro BIPS of Example 3. In substantial darkness the mirror is colored. When in a rear view mirror the glare of headlights from following vehicles is attenuated. When in substantial daylight at room temperature, the mirror gradually becomes colorless.

A heating element is added to the rear view mirror of this example. The colorless mirror under substantial day-light conditions is removed to an environment of substantial darkness. The heating element is activated to apply heat to the mirror and the mirror becomes colored in a few minutes.

We claim:
1. A color-reversible anti-glare mirror system comprising a mirrored viewing surface containing a reflecting surface used in combination with a color-reversible layer means for attenuating light when in substantial darkness but which means is reversible to an essentially transparent, non-light attenuating state when in ordinary daylight conditions and wherein said layer means is positioned between a light source and said reflecting surface so that light passing from said light source to a viewer by way of said mirrored surface passes through said layer means.

2. A mirror system as in claim 1 wherein said color-reversible layer means comprises at least one photochromic compound.

3. A mirror system as in claim 1 wherein said color-reversible layer means comprises at least one thermochromic compound.

4. A mirror system as in claim 3 containing a heating means.

5. A mirror system as in claim 1 wherein said color-reversible layer means comprises at least one spiropyran compound.

6. A mirror system as in claim 5 wherein said spiropyran compound is at least one of those having the formula selected from the group consisting of

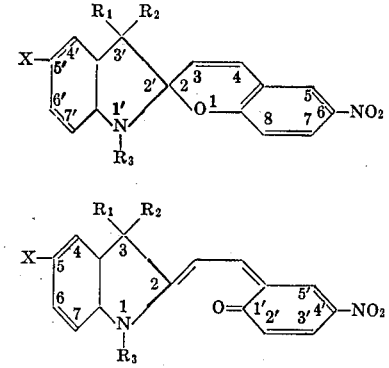

wherein X is a member selected from the group consisting of a halide group, a nitro group, and a hydrogen group, and $R_1$, $R_2$, and $R_3$ are alkyl and/or aryl groups.

7. A mirror system as in claim 6 wherein X represents a chloride group and wherein $R_1$, $R_2$, and $R_3$ represent methyl groups.

8. A mirror system as in claim 6 wherein X represents a hydrogen group and $R_1$, $R_2$, and $R_3$ represent methyl groups.

9. A mirror system as in claim 6 wherein X represents a nitro radical.

10. A mirror system as in claim 6 containing a heating means.

11. A mirror system as in claim 1 wherein said color-reversible layer means comprises a color reversible material incorporated in a resin.

12. A mirror system as in claim 1 wherein said color-reversible layer means is in the form of a solution.

13. A mirror system as in claim 1 wherein said color-reversible layer means is located between a partially reflective mirrored surface and a substantially fully reflective mirrored surface.

14. A color-reversible anti-glare motor-vehicle rear-view mirror to reduce glare from the headlights of a following vehicle comprising a mirrored viewing surface containing a reflecting surface in combination with a color-reversible layer means which attenuates light when in substantial darkness for a prolonged period and which means is reversible to an essentially transparent, non-light attenuating state when in substantial light for a prolonged period, said color-reversible layer means being positioned between the headlights of said following motor vehicle and said reflecting surface so that light from the headlights of said following motor vehicle passes through said color-reversible layer means and is attenuated before it is reflected from said reflecting surface to a viewer.

References Cited

UNITED STATES PATENTS

| | | |
|---|---|---|
| 3,386,788 | 6/1968 | Dreyer. |
| 2,311,400 | 2/1943 | Landell _____ 350—278 |
| 2,790,350 | 4/1957 | Cameron _____ 350—278 X |
| 3,100,778 | 8/1963 | Berman. |
| 3,149,120 | 9/1964 | Berman. |
| 3,231,584 | 1/1966 | Berman. |
| 3,280,701 | 10/1966 | Donnelly et al. ____ 350—278 X |

PAUL R. GILLIAM, Primary Examiner

U.S. Cl. X.R.

350—160; 260—319; 117—35, 69, 124; 96—90